(12) United States Patent
Graser et al.

(10) Patent No.: US 6,944,595 B1
(45) Date of Patent: Sep. 13, 2005

(54) APPARATUS AND METHOD FOR PERFORMING CONVERSION BETWEEN DIFFERENT UNITS OF CURRENCY USING AN ENCAPSULATED CONVERSION PATH OF EXCHANGE RATES

(75) Inventors: Timothy James Graser, Rochester, MN (US); Dave Henry Gross, Oronoco, MN (US); Bradley William Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 09/275,984

(22) Filed: Mar. 25, 1999

(51) Int. Cl.[7] .............................................. G06F 17/60
(52) U.S. Cl. ................................ 705/1; 705/39; 705/40
(58) Field of Search ................................ 705/1, 39, 40

(56) References Cited

U.S. PATENT DOCUMENTS

| | | | | |
|---|---|---|---|---|
| 4,120,451 A | * | 10/1978 | Stapleton | 235/89 R |
| 4,251,867 A | * | 2/1981 | Uchida et al. | 705/39 |
| 5,742,932 A | * | 4/1998 | Levitsky | 705/410 |
| 5,787,402 A | * | 7/1998 | Potter et al. | 705/37 |
| 5,884,283 A | * | 3/1999 | Manos | 705/30 |
| 5,897,621 A | * | 4/1999 | Boesch et al. | 705/26 |
| 5,960,418 A | * | 9/1999 | Kelly et al. | 705/408 |
| 5,963,647 A | * | 10/1999 | Downing et al. | 705/39 |
| 6,128,598 A | * | 10/2000 | Walker et al. | 705/4 |
| 6,199,046 B1 | * | 3/2001 | Heinzle et al. | 705/1 |
| 6,199,197 B1 | * | 3/2001 | Engstrom et al. | 717/2 |
| 6,269,345 B1 | * | 7/2001 | Riboud | 705/35 |

FOREIGN PATENT DOCUMENTS

| | | | | |
|---|---|---|---|---|
| EP | 999511 | * | 5/2000 | G06F/17/60 |
| JP | 2000194898 A | * | 12/1998 | G07D/1/04 |

OTHER PUBLICATIONS

"International: As the Continent Prepares for the Euro, Card Issuers See Limited Impact", Credit Card News, Dec. 15, 1998, Faulkner & Gray, Inc.*

"Economic Research Service: Agricultural outlook—Part II of IV", May 22, 1998, M2 Presswire.*

* cited by examiner

*Primary Examiner*—John G. Weiss
*Assistant Examiner*—Akiba Robinson Boyce
(74) *Attorney, Agent, or Firm*—Martin & Associates, LLC; Derek P. Martin

(57) ABSTRACT

A conversion path for converting between two different currencies is defined as a series of simple exchange rate objects and is encapsulated within a compound exchange rate object. The intelligence regarding the specific rules for making the conversion are encapsulated in a policy class, which governs how the path of exchange rates contained in the compound exchange rate is built. When a client requests conversion between two currencies, the compound exchange rate is constructed according to the policy to contain a path of exchange rate objects that may be used to make the requested conversion, and the compound exchange rate is then returned to the client. When the client then instructs the compound exchange rate to make a conversion of a known currency value in the source currency, the compound exchange rate object uses the exchange rate object or objects in the exchange rate path to perform the currency conversion. A system in accordance with the invention thus allows the computation of exchange rates in a fully encapsulated manner according to a predefined policy without the client having to know the details of how the conversion is performed.

13 Claims, 4 Drawing Sheets

APPARATUS AND METHOD FOR PERFORMING CONVERSION BETWEEN DIFFERENT UNITS OF CURRENCY USING AN ENCAPSULATED CONVERSION PATH OF EXCHANGE RATES

BACKGROUND OF THE INVENTION

1. Technical Field

This invention generally relates to the representation of currency units in a computer, and more specifically relates to the conversion of an amount in one currency to an amount in a different currency.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems can quickly and efficiently manipulate numbers and perform numerical calculations. Computers are in widespread use in business and industry to generate and track financial transactions. One common financial transaction is the conversion an amount of money in one currency to an equivalent amount in a different currency using exchange rates. The conversion from one currency to a different currency is relatively straightforward when a direct exchange rate between the different currency units is available. For the purpose of the discussion herein, the term "source currency" represents the currency units of a known quantity, while the "target currency" represents the currency units of a different currency that need to be represented as the equivalent to the known quantity of source currency units. In other words, if a system knows a price in French Francs (FRF) (the source currency), and needs a price in German Deutschmarks (DEM) (the target currency), the system can easily use a FRF-to-DEM exchange rate to convert from French Francs to German Deutschmarks by multiplying the price in French Francs by the FRF-to-DEM exchange rate to arrive at a price in Deutschmarks. The FRF-to-DEM exchange rate specifies French Francs as the "from currency" and German Deutschmarks as the "to currency", thereby indicating the direction of the exchange. A conversion from French Francs to German Deutschmarks using the FRF-to-DEM exchange rate is referred to as a direct conversion, and the FRF-to-DEM exchange rate is referred to as a direct exchange rate for this type of conversion. Often, however, direct exchange rates are not available for all currency conversions.

If no direct exchange rate between source and target currency is available, a virtual exchange rate may be generated from other exchange rates. In the example above, if the FRF-to-DEM exchange rate is not available, but a DEM-to-FRF exchange rate is available, the DEM-to-FRF exchange rate may be inverted to generate a FRF-to-DEM conversion rate. In another example, if the FRF-to-DEM exchange rate is not available, but a FRF-to-GBP (Great Britain pounds) exchange rate and a GBP-to-DEM exchange rate are available, the FRF-to-GBP exchange rate may be multiplied by the GBP-to-DEM exchange rate to generate a FRF-to-DEM exchange rate. When the conversion path between two currencies includes two exchange rates with a single intermediate currency, the conversion process is known in the art as "triangulation".

Due to limitations in the precision of calculations in computer systems that deal with currency, inverting an exchange rate may produce a rate that is less accurate than the non-inverted exchange rate. Furthermore, multiplying multiple exchange rates to generate a new exchange rate can also lead to loss of precision, particularly as the number of intermediate steps increases. Due to these conversion concerns, the European Monetary Union (EMU) has detailed regulations regarding how currency conversions are to be performed. These requirements are described in detail below.

With the introduction of the euro, the EMU has set forth rules regarding conversion and rounding. For example, no inverted rates derived from known conversion rates may be used. In addition, all conversions between national currency units must be performed as follows: monetary amounts to be converted from one national currency unit into another shall first be converted into a monetary amount expressed in the euro unit, which amount may be rounded to not less than three decimals and shall then be converted into the other national currency unit. No alternative method of calculation may be used unless it produces the same result. "Preparing Financial Information Systems for the euro", European Commission, Directorate General XV, Internal Market and Financial Services, Section II(B)(f) (Brussels, 15 Dec. 1997). These EMU standards for converting from one national currency to another do not necessarily produce the most precise result. However, requiring that all systems adhere to this standard will increase the likelihood that the results from one system to the next will be uniform within an acceptable level of precision. Uniformity of exchange rates between systems is a more important goal for the EMU than a high level of precision.

The introduction of the euro will make triangulation more commonplace, because the EMU requires that exchange rates be kept between participating EMU currencies and the euro, but not directly between separate EMU currencies. However, triangulation must now be done according to the EMU regulations discussed above. These rules require computer systems that perform currency conversions to potentially change how the conversions are performed to conform to the rules. Prior art systems that use inverted exchange rates or triangulation in some other manner to generate virtual exchange rates must now be changed to first convert from the source currency to the euro, then convert from the euro to the target currency.

Some known computer systems use object oriented programs that perform currency conversions. The SanFrancisco Framework developed by IBM is one example of an object oriented solution that provides currency conversions. When a conversion between currencies needs to be performed, a client program requests an exchange rate. If no direct exchange rate is available, the framework computes a virtual exchange rate by multiplying multiple exchange rates together, and returns a virtual exchange rate. In this manner, the exchange rate calculations are encapsulated, and the client that requests the exchange rate does not know how the exchange rate was retrieved or generated. However, this method of computing exchange rates does not conform to the EMU regulations discussed above. One way to satisfy the EMU regulations is to unencapsulate the exchange rate so that the client now must find the source to EMU exchange rate, the EMU to target exchange rate, and perform the conversion according to the EMU regulations. However, unencapsulating the exchange rate requires all client code that uses exchange rates to have knowledge of the specific conversion methods used, making code maintenance much more difficult. Without a mechanism for allowing a computer system to retrieve an encapsulated exchange rate that conforms to the EMU regulations for currency conversions, the computer industry will have to spend considerable time and resources to convert their software to adhere to the EMU conversion standards.

DISCLOSURE OF INVENTION

According to the present invention, a conversion path for converting between two different currencies is defined as a series of simple exchange rate objects and is encapsulated within a compound exchange rate object. The intelligence regarding the specific rules for making the conversion are encapsulated in a policy class, which governs how the path of exchange rates contained in the compound exchange rate is built. When a client requests conversion between two currencies, the compound exchange rate is constructed according to the policy to contain a path of exchange rate objects that may be used to make the requested conversion, and the compound exchange rate is then returned to the client. When the client then instructs the compound exchange rate to make a conversion of a known currency value in the source currency, the compound exchange rate object uses the exchange rate object or objects in the exchange rate path to perform the currency conversion. A system in accordance with the invention thus allows the computation of exchange rates in a fully encapsulated manner according to a predefined policy without the client having to know the details of how the conversion is performed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
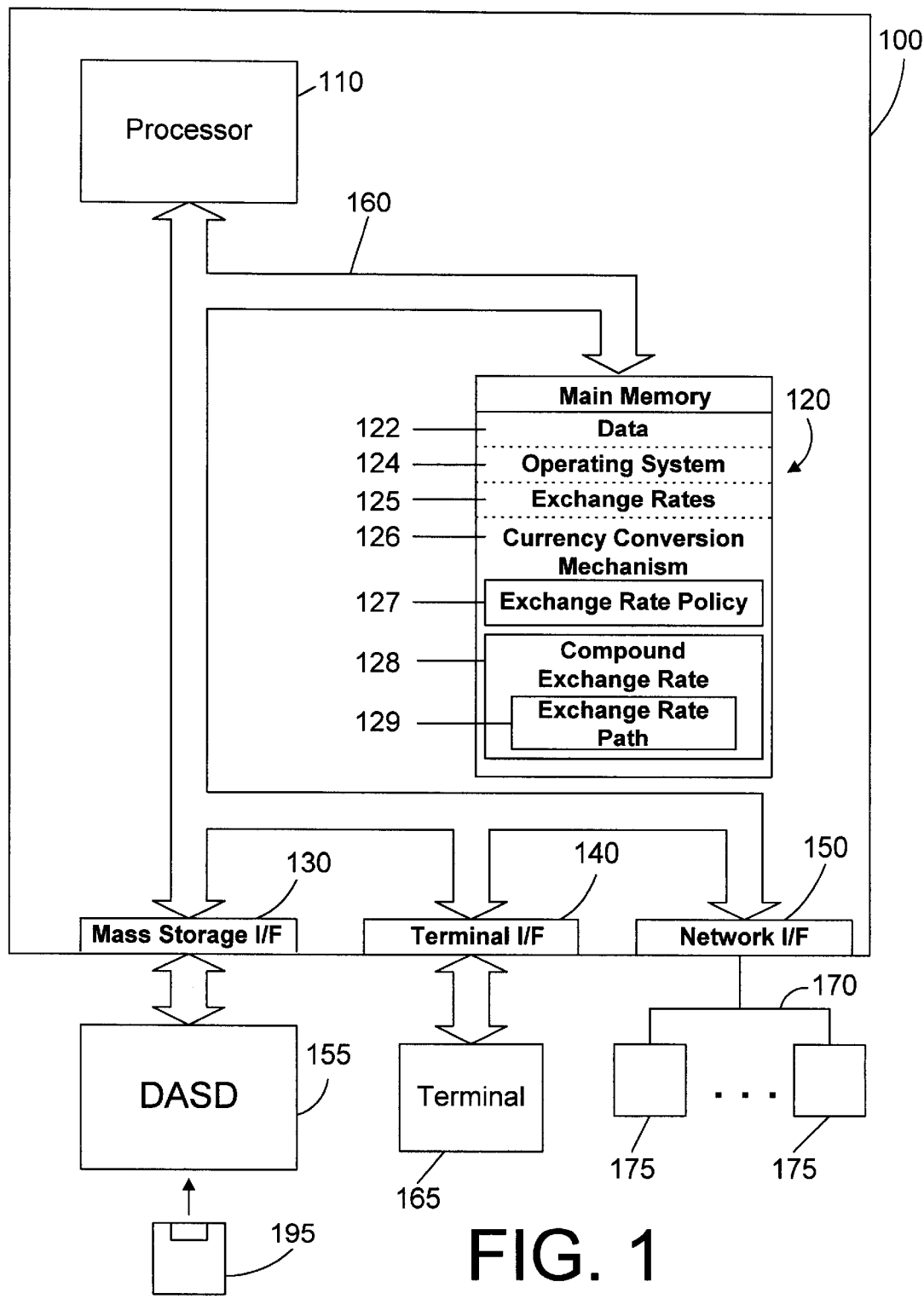
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Object Oriented Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification does not imply any connection between the inventors and/or the assignee of this patent application and Mr. Booch or Mr. Booch's employer. The notational system used by Mr. Booch is more fully explained at Chapter 5, pp. 171–228 of the aforementioned book, and is generally understood by those skilled in the art. Of course, the concepts of the invention could be represented in other equivalent notations as well.

2. Detailed Description

According to a preferred embodiment of the present invention, an apparatus and method provide a way to convert an amount in one currency to an equivalent amount in a different currency using an encapsulated conversion path. This conversion path is preferably constructed according to a predefined set of rules referred to herein as an exchange rate policy. Such a system allows for easily implementing the conversion rules of the EMU by encapsulating the rules within an exchange rate policy. By encapsulating the rules within the policy, a client that wants to convert units in one currency to units in another currency does not need to know the specifics of how the conversion is performed.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, exchange rates 125, and a currency conversion mechanism 126. Currency conversion mechanism 126 includes an exchange rate policy 127, and a compound exchange rate 128, which includes an exchange rate path 129. While the currency conversion mechanism 126 is shown in FIG. 1 as residing separate from operating system 124, it is equally within the scope of the invention that currency conversion mechanism 126 reside within operating system 124, or within any other computer program.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Exchange rates 125 are a collection in memory of known direct exchange rates between two currencies. In the preferred embodiment, each exchange rate 125 is an object oriented object that specifies a conversion multiplier for a specific source-to-target conversion. In other words, each exchange rate 125 preferably represents a direct conversion between two currencies. Currency conversion mechanism 126 is preferably an object oriented portion of code that may be invoked by a client to perform the currency conversions discussed herein. Currency conversion mechanism 126 includes means for constructing an exchange rate path 129. Exchange rate policy 127 is preferably an object oriented class that encapsulates the logic for performing conversions between different currencies. Any suitable rules or logic for performing currency conversions may be placed within exchange rate policy 127. For example, the specific EMU regulations that relate to currency conversions may be programmed into exchange rate policy 127.

Compound exchange rate 128 in the preferred embodiment is an object oriented object that encapsulates the currency conversion method specified in the exchange rate policy 127 by providing an exchange rate path 129 for performing the conversion in accordance with the policy. Exchange rate path 129 in the preferred embodiment is an ordered list of individual exchange rate objects that form a path from the source to the target currency. Once the exchange rate path 129 has been constructed, the currency conversion mechanism 126 invokes the compound exchange rate 128, passing in the source currency amount. The compound exchange rate 128 performs the series of conversions as specified in the exchange rate path 129 to arrive at an amount in the target currency that is equivalent to the amount in the source currency. Compound exchange rate 128 thus includes means for using all exchange rates in the exchange rate path to sequentially operate on a currency value to produce a value in the target currency.

The currency conversion is encapsulated within the compound exchange rate object 128. The client program simply requests a compound exchange rate 128 for converting a specified source currency to a specified target currency, which causes the compound exchange rate object 128 to build the exchange rate path 129 for the specified conversion. The compound exchange rate 128 is then invoked, passing the source currency value. The compound exchange rate 128 then performs the series of conversions specified in the exchange rate path 129, and returns a result in the target currency that is equivalent to the amount in the source currency.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, exchange rates 125, and currency conversion mechanism 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
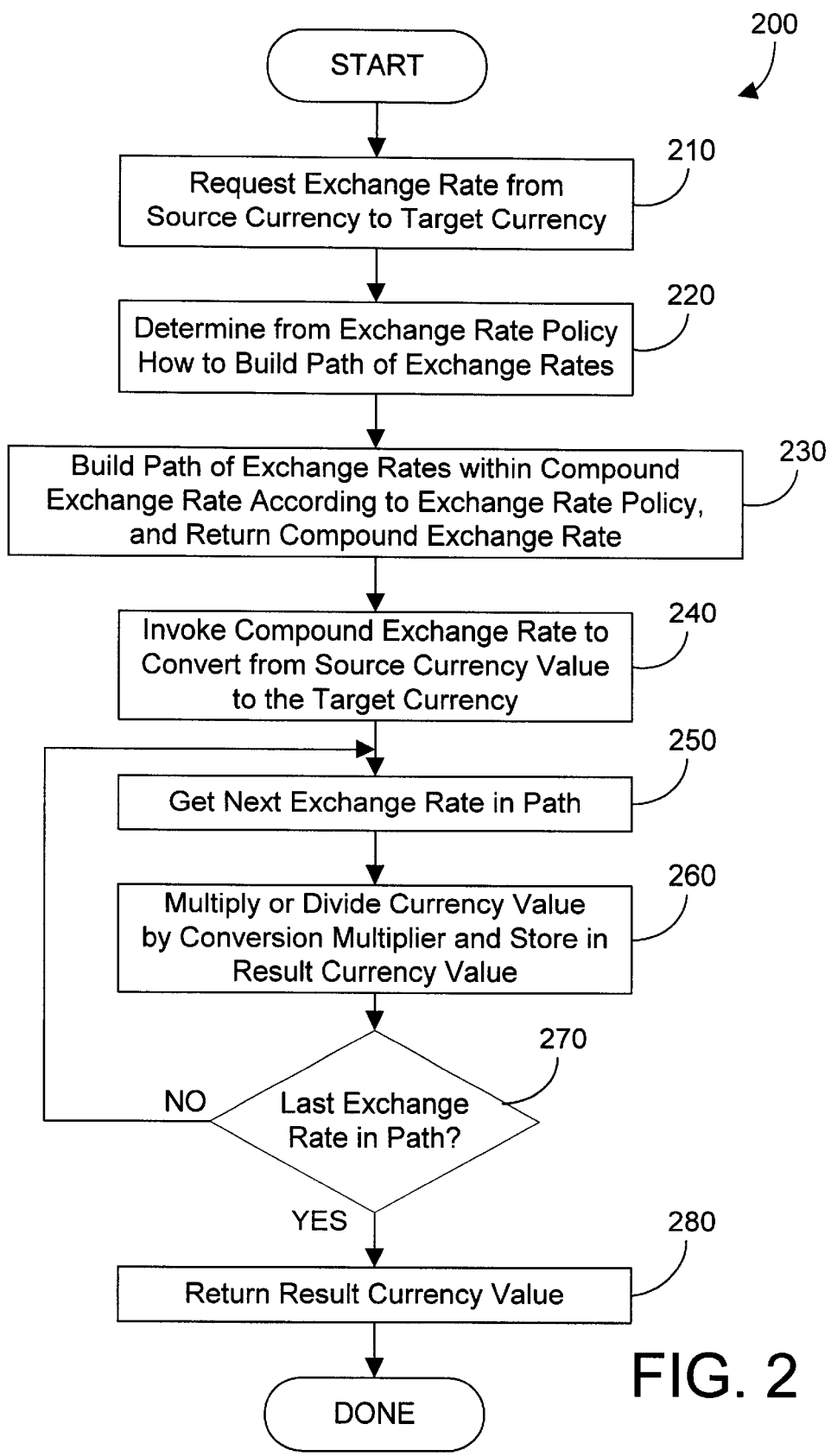
FIG. 2 is a flow diagram of a method in accordance with a preferred embodiment of the invention.

Referring to FIG. 2, a method 200 for performing currency conversions refers by way of example to elements 125–129 in FIG. 1 to illustrate the preferred method for apparatus 100 in accordance with the preferred embodiments. Method 200 begins by a client program requesting an exchange rate from the source currency to the target currency (step 210). Next, the currency conversion mechanism 126 determines from the exchange rate policy 127 how to build a path of exchange rates to perform the requested conversion from source currency to target currency (step 220). The path of exchange rates is then built within the compound exchange rate object 128, and the compound exchange rate object 128 is returned to the client as the appropriate exchange rate object for the conversion (step 230). The client then invokes the convert method on the compound exchange rate 128, passing the source currency and value (step 240). The compound exchange rate 128 then gets the next exchange rate in the exchange rate path 129 (step 250), which is the first exchange rate in the path the first time step 250 is encountered. Method 200 then multiplies or divides the currency value by a conversion multiplier in the exchange rate and stores the result in a result currency value (step 260). The decision of whether to multiply or divide depends on the exchange rate selected in step 250. If the exchange rate in step 250 specifies a direct exchange rate, the exchange rate is multiplied by the currency value in step 260. If the exchange rate in step 250 specifies an inverse exchange rate (i.e., if the conversion path is backwards from the desired conversion direction), the currency value is divided by the exchange rate in step 260. If there are still more exchange rates in the compound exchange rate (step 270=NO), the next exchange rate is retrieved (step 250), and the result currency value from the last iteration is multiplied or divided by the conversion multiplier and stored in the result currency value (step 260). This process iterates through all exchange rates in exchange rate path 129 until all exchange rates in the path have been processed (step 270=YES). At this point the result currency value is returned to the client (step 280).

Method 200 illustrates how the details of the implementation of currency conversion mechanism 126 are encapsulated and therefore do not matter to the client. All the client knows is that it needs an exchange rate, and that once it has received the exchange rate, it invokes the convert method on the exchange rate, passing the source currency and value, and the exchange rate returns the equivalent value in the target currency.

Figure 3:
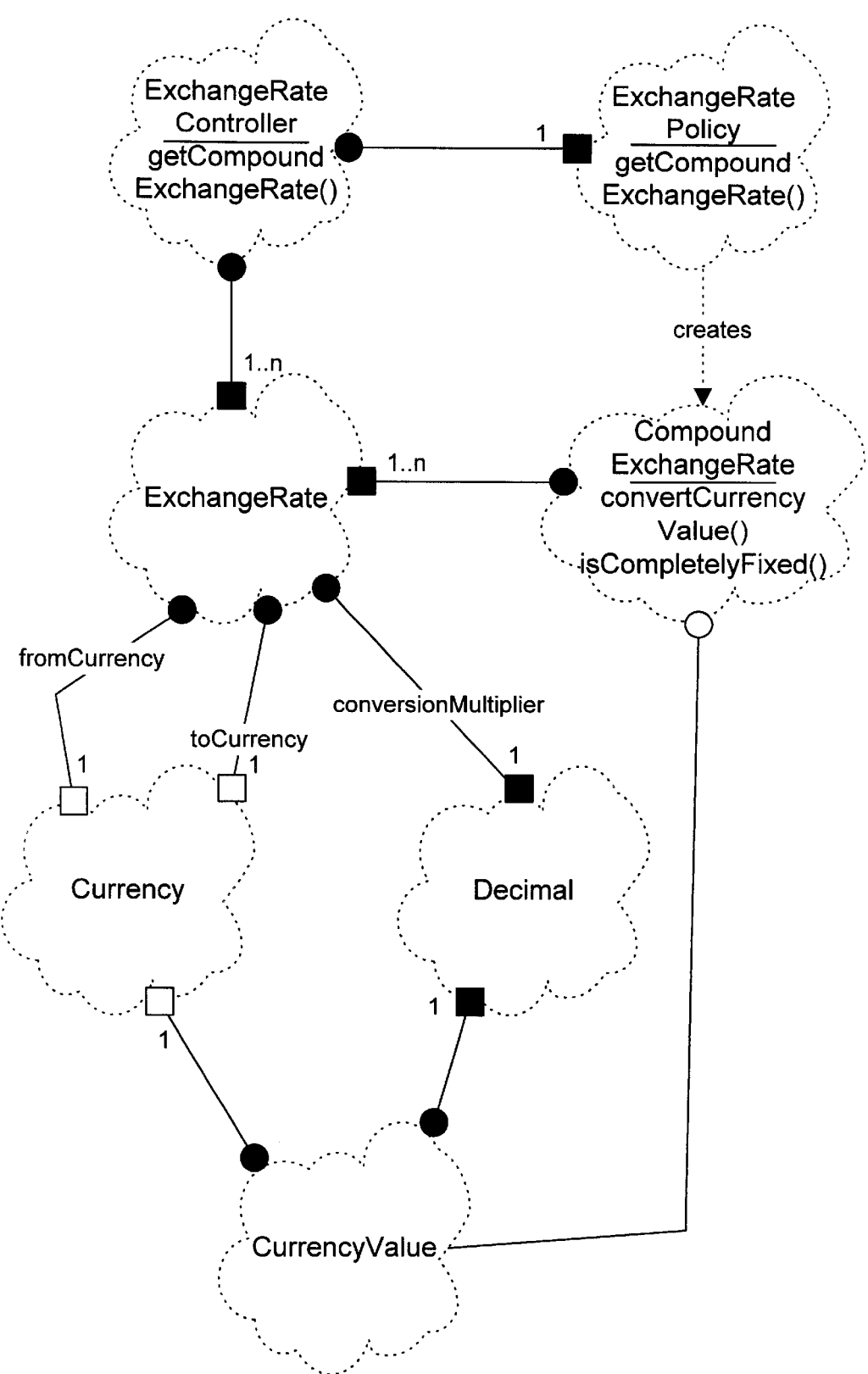
FIG. 3 is a class diagram of an example of an object oriented implementation of the currency conversion mechanism 126 of FIG. 1.

Referring to FIG. 3, a class diagram in accordance with the preferred embodiments shows the relationship of several object oriented classes that preferably comprise currency conversion mechanism 126. Other implementations are possible within the scope of the present invention. An ExchangeRatePolicy class corresponds to the exchange rate policy 127 of FIG. 1, and contains the logic for performing currency conversions. The specific rules for performing currency conversions are preferably implemented within the ExchangeRatePolicy class. The ExchangeRatePolicy class includes a method getCompoundExchangeRate( ), which is used to create a CompoundExchangeRate class in accordance with the rules in the ExchangeRatePolicy. The ExchangeRateController is a collection class that contains one ExchangeRatePolicy and one or more ExchangeRates. The ExchangeRateController class also defines a getCompoundExchangeRate( ) method, which is the client interface to retrieving a compound exchange rate from currency conversion mechanism 126.

The CompoundExchangeRate class defines a convertCurrencyValue( ) method that is invoked by a client to perform the currency conversion defined by the exchange rate path stored within the CompoundExchangeRate. Another method isCompletelyFixed( ) may be invoked by a client to determine whether all of the exchange rates in the exchange rate path are fixed. If all the exchange rates are fixed, the currencies may be treated as different denominations of the same currency. Many financial systems that perform currency conversions require special handling when the source and target currencies are the same. Thus, invoking the isCompletelyFixed( ) method allows such a system to recognize that even though the currencies are different, they should be treated as if they are the same, and to perform any required special processing.

Each CompoundExchangeRate contains one or more instances of ExchangeRate, which make up the exchange rate path 129 in FIG. 1. Each exchange rate includes a fromCurrency, a toCurrency, and a conversionMultiplier. The fromcurrency and toCurrency are instances of the Currency class, which specify the currency units for the source and target currencies. The conversionMultiplier is an instance of the Decimal class, and represents a decimal multiplier for converting a currency value in the source currency to a currency value in the target currency. The CurrencyValue class contains the Currency and Decimal classes, with the currency units specified by the Currency class and the value specified in the Decimal class. Thus, a CurrencyValue of 50 French Francs would include a Decimal value of 50, and a Currency value of French Francs. In this manner the units of a currency are tracked separate from the value.

Figure 4:
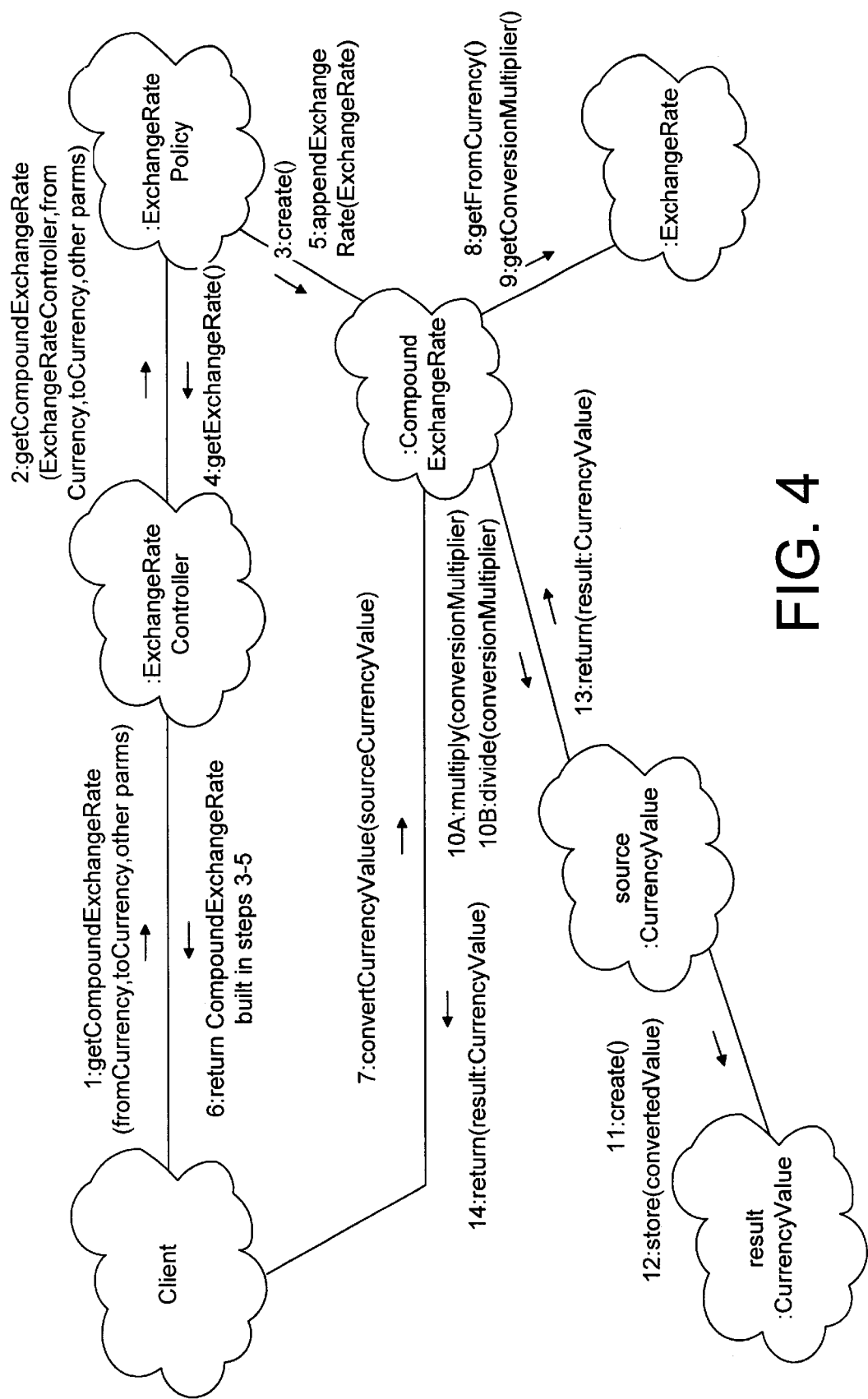
FIG. 4 is an object interaction diagram illustrating the flow of control between instances of the classes shown in FIG. 3.

Referring to FIG. 4, a representative object interaction diagram for the classes of FIG. 3 shows the flow in performing exchange rate conversions in accordance with the preferred embodiments. First, the Client object calls the getCompoundExchangeRate( ) method on the ExchangeRateController object, passing the fromCurrency, toCurrency, and possibly other constraining parameters with the call (step 1). In response, the ExchangeRateController object invokes the getCompoundExchangeRate( ) method on the ExchangeRatePolicy object, passing itself, the fromCurrency, toCurrency, and possibly other parameters with the call (step 2). The ExchangeRatePolicy object then invokes the constructor method on the CompoundExchangeRate class (step 3), which creates an instance of the CompoundExchangeRate class. Next, the ExchangeRatePolicy object invokes a getExchangeRate( ) method on the ExchangeRateController object (step 4), which causes the ExchangeRateController object to return the first exchange rate in the exchange rate path. The exchange rate is added to the CompoundExchageRate object by invoking its appendExchangeRate( ) method, passing the ExchangeRate as a parameter. The CompoundExchangeRate object preferably has an ordered list or some other suitable data structure that specifies the path of exchange rates that must be followed to perform the requested currency conversion. Thus, the first time the appendExchangeRate( ) method is invoked, the first exchange rate is placed in the first slot in the ordered list. Steps 4 and 5 are then repeated for each step in exchange rate path, with each exchange rate being added to the ordered list in the CompoundExchangeRate object by invoking the appendExchangeRate( ) method. In this manner the exchange rate path 129 may be built one step at a time until a path from source to target currencies is built. Note that the direction of the conversion is not important when considering whether or not to include an exchange rate into the exchange rate path 129. The CompoundExchangeRate object will detect and compensate for all inverse rates in step 10, explained below. Once all needed exchange rates that are required to make the conversion from source to target currency are identified and placed in the ordered list within the CompoundExchangeRate object, the CompoundExchangeRate object is returned to the client (step 6).

Once the Client has the CompoundExchangeRate object, it invokes the convertCurrencyValue( ) method on the CompoundExchangeRate object, passing the sourceCurrencyValue as a parameter (step 7). At this point, the CompoundExchangeRate object takes over to perform the requested currency conversion. The CompoundExchangeRate object selects the first exchange rate object on its ordered list that makes up the exchange rate path 129, and invokes the getFromCurrency( ) method on the selected ExchangeRate object (step 8). In response, the ExchangeRate returns to the CompoundExchangeRate its fromCurrency. The CompoundExchangeRate then determines from the fromCurrency whether the ExchangeRate is a direct rate or an inverse rate. Next, the CompoundExchangeRate invokes the getConversionMultiplier( ) method on the ExchangeRate object (step 9) to retrieve the decimal representation of the conversion multiplier. If the fromCurrency of the ExchangeRate indicates that the ExchangeRate is a direct rate, a multiply( ) method is invoked on the source:CurrencyValue object, which causes the source currency value to be multiplied by the conversionMultiplier (step 10A). If, however, the fromcurrency of the ExchangeRate indicates that the ExchangeRate is an inverse rate (meaning that the conversion path is backwards from the desired path), a divide( ) method is invoked on the source:CurrencyValue object, which causes the source currency value to be divided by the ExchangeRate (step 10B). In this manner inverse rates are automatically detected, and the ExchangeRate is used as-is, without performing inversions that are not allowed under the EMU regulations.

The source:CurrencyValue object then invokes the constructor on the result:CurrencyValue class (step 11), and passes the converted value of the source currency value in the new class (step 12). The value in the result:CurrencyValue object may be rounded according to rules that govern the rounding of amounts in that particular currency, thereby assuring that the result is stored with the required precision. At this point the return:CurrencyValue is returned to the CompoundExchangeRate object (step 13), which then determines whether any more steps remain in the conversion path. If more exchange rates (i.e., steps) exist in the exchange rate path, steps 8–13 are performed again for each exchange rate in the exchange rate path until all exchange rates in the exchange rate path have been processed. At this point, the CompoundExchangeRate knows that the result is in the target currency, and the result object is returned to the client (step 14).

One significant advantage of the currency conversion mechanism and method in accordance with the present invention is the ability to round the conversion at each step along the conversion path according to the rounding rules for that particular currency. For example, lets assume that a conversion path consists of the following ordered list of exchange rates: 1) French Francs to British Pounds, 2) British Pounds to Swedish Crowns, and 3) Swedish Crowns to Belge Francs. When the source currency value in French Francs is converted to British Pounds in step 1, the result in British Pounds may be rounded according to published guidelines for rounding currency amounts in British Pounds. When the amount in British Pounds is converted to Swedish Crowns in step 2, the result is again rounded according to the published guidelines for rounding currency amounts in Swedish Crowns. Likewise, when the amount in Swedish Crowns is converted to Belge Francs in step 3, the result is once again rounded according to the published guidelines for rounding currency amounts in Belge Francs. The guidelines for rounding each national currency are typically published by their issuing governments. The present invention thus allows a multi-step conversion path to be built while maintaining the desired rounding conventions for each intermediate currency and for the target currency.

Encapsulating the exchange rate path within the CompoundExchangeRate object allows easy inspection and verification of the method used in performing the exchange rates. For example, if the ExchangeRatePolicy specifies EMU standards for converting a source currency to an amount in euros, and for the converting the amount in euros to the amount in the target currency, the resulting exchange rate path in the CompoundExchangeRate object will reflect the conversion path. Note that exchange rates from the euro to the national currencies are usually specified, and the inverse rates are usually left to be derived as needed. Thus, a conversion from French Francs to German Deutschmarks will have the following path: euro-to-DEM, euro-to-FRF. Note that the CompoundExchangeRate object will detect that the first exchange rate (euro-to-DEM) is an inverse rate because the "from currency" (euro) does not match the expected source currency, which is French Francs. As a result, the CompoundExchangeRate object will use the conversion multiplier in a division operation (step 10B of FIG. 4) to perform the conversion in the desired direction. By providing an exchange rate path within the Compound-ExchangeRate object, regulators can easily verify that the exchange rate calculations are performed according to desired standards. (Note that these standards are specified in the ExchangeRatePolicy object.)

The preferred embodiments herein disclose an apparatus and method for performing currency conversions according to any desired criteria set by the exchange rate policy by constructing an exchange rate path within a compound exchange rate object. Note that in the simple case when a direct exchange rate is available from source to target currency, only one exchange rate will be included in the exchange rate path. The more interesting case, however, is when a direct exchange rate is not available. The compound exchange rate can then build an ordered path of exchange rates and perform the desired conversion. In this manner the implementation of the policy is encapsulated from the client. In fact, the clients knows nothing about the exchange rate path and the steps that are performed in the conversion. The client simply requests a compound exchange rate, then invokes a convertCurrencyValue( ) method that causes the compound exchange rate object to perform the desired conversion and return the converted currency value.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   (1) at least one processor;
   (2) a memory coupled to the at least one processor;
   (3) a plurality of object oriented exchange rate objects residing in the memory, each exchange rate object specifying a "from currency", a "to currency", and a conversion multiplier for converting an amount in the "from currency" to an equivalent amount in the "to currency" by multiplying the amount in the "from currency" by the conversion multiplier to calculate the equivalent amount in the "to currency", the exchange rate comprising a direct exchange rate if the "from currency" is an expected currency and comprising an inverse exchange rate if the "to currency" is the expected currency;
   (4) a compound exchange rate object residing in the memory that contains an exchange rate path from a source currency to a target currency according to predefined rules, the exchange rate path comprising an ordered list of at least one of the plurality of exchange rate objects; and
   (5) a currency conversion mechanism residing in the memory and executed by the at least one processor, the currency conversion mechanism constructing the compound exchange rate object, and performing the steps of:
      (5A) selecting the first exchange rate in the exchange rate path as a current exchange rate;
      (5B) selecting the value in the source currency as the current value;
      (5C) determining the "from currency" of the current exchange rate;
      (5D) determining from the "from currency" of the current exchange rate whether the current exchange rate is a direct exchange rate;
      (5E) if the current exchange rate is a direct exchange rate, multiplying the current value by the conversion multiplier corresponding to the current exchange rate, and storing the result as a return value and as the current value;
      (5F) if the current exchange rate is an inverse exchange rate, dividing the current value by the conversion multiplier corresponding to the current exchange rate, and storing the result as the return value and as the current value;
      (5G) selecting the next exchange rate object in the exchange rate path, if any, as the current exchange rate;
      (5H) repeating steps (5C) through (5G) until the return value is in the target currency; and
      (5I) returning the return value.

2. The apparatus of claim 1 wherein the currency conversion mechanism evaluates the "from currency" for each exchange rate object in the exchange rate path, the conversion mechanism performing only one of the steps of:
   a) multiplying the currency value by the exchange rate conversion multiplier if the "from currency" of the exchange rate object corresponds to the currency value;
   b) dividing the currency value by the exchange rate conversion multiplier if the "from currency" of the exchange rate object does not correspond to the currency value.

3. The apparatus of claim 1 further comprising an exchange rate policy residing in the memory that defines rules for constructing the exchange rate path to assure the currency conversion mechanism performs currency conversions in accordance with the rules in the exchange rate policy.

4. The apparatus of claim 3 wherein the exchange rate policy specifies rules for constructing the exchange rate in accordance with rules established by the European Monetary Union for converting currencies after introduction of the euro, namely:
   that the conversion from a first national currency to a second national currency be performed by performing steps that include the steps of:
      1) converting an amount in the first national currency to an equivalent amount in euros without using inverted exchange rates;
      2) converting the equivalent amount in euros to an equivalent amount in the second national currency without using inverted exchange rates.

5. A computer-implemented method for converting a value in a source currency to an equivalent value in a target currency, the method comprising the steps of:
   (1) building an object oriented compound exchange rate object that contains an exchange rate path from the source currency to the target currency according to predefined rules, the exchange rate path comprising an ordered list of at least one exchange rate object, each exchange rate object specifying a "from currency", a "to currency", and a conversion multiplier for converting an amount in the "from currency" to an equivalent amount in the "to currency" by multiplying the amount in the "from currency" by the conversion multiplier to calculate the equivalent amount in the "to currency", the exchange rate comprising a direct exchange rate if the "from currency" is an expected currency and comprising an inverse exchange rate if the "to currency" is the expected currency;

(2) the compound exchange rate object performing the steps of:
  (2A) selecting the first exchange rate in the exchange rate path as a current exchange rate;
  (2B) selecting the value in the source currency as the current value;
  (2C) determining the "from currency" of the current exchange rate;
  (2D) determining from the "from currency" of the current exchange rate whether the current exchange rate is a direct exchange rate;
  (2E) if the current exchange rate is a direct exchange rate, multiplying the current value by the conversion multiplier corresponding to the current exchange rate, and storing the result as a return value and as the current value;
  (2F) if the current exchange rate is an inverse exchange rate, dividing the current value by the conversion multiplier corresponding to the current exchange rate, and storing the result as the return value and as the current value;
  (2G) selecting the next exchange rate object in the exchange rate path, if any, as the current exchange rate;
  (2H) repeating steps (2C) through (2G) until the return value is in the target currency; and
  (2I) returning the return value.

6. The method of claim 5 wherein the predefined rules comprise an exchange rate policy.

7. A computer-implemented method for converting a value in a source currency to an equivalent value in a target currency, the method comprising the steps of:
  (1) building a compound exchange rate object that contains an exchange rate path from the source currency to the target currency according to predefined rules, the exchange rate path comprising an ordered list of at least one exchange rate object, each exchange rate object specifying a "from currency", a "to currency", and a conversion multiplier for converting an amount in the "from currency" to an equivalent amount in the "to currency" by multiplying the amount in the "from currency" by the conversion multiplier to calculate the equivalent amount in the "to currency", the exchange rate comprising a direct exchange rate if the "from currency" is an expected currency and comprising an inverse exchange rate if the "to currency" is the expected currency, the step of building the compound exchange rate object comprising the steps of:
    (1A) if one exchange rate object exists that has a "from currency" equal to the source currency and a "to currency" equal to the target currency, placing the exchange rate object in the ordered list;
    (1B) if one exchange rate object exists that has a "from currency" equal to the target currency and a "to currency" equal to the source currency, placing the exchange rate object in the ordered list;
    (1C) if neither of steps (1A) or (1B) put an exchange rate into the ordered list, determining whether multiple exchange rates exist that may be combined to form a path of exchange rates that span from the source currency to the target currency, and if so, placing the multiple exchange rates in the ordered list in sequential order;
  (2) the compound exchange rate object performing the steps of:
    (2A) selecting the first exchange rate in the exchange rate path as a current exchange rate;
    (2B) selecting the value in the source currency as the current value;
    (2C) determining the "from currency" of the current exchange rate;
    (2D) determining from the "from currency" of the current exchange rate whether the current exchange rate is a direct exchange rate;
    (2E) if the current exchange rate is a direct exchange rate, multiplying the current value by the conversion multiplier corresponding to the current exchange rate, and storing the result as a return value and as the current value;
    (2F) if the current exchange rate is an inverse exchange rate, dividing the current value by the conversion multiplier corresponding to the current exchange rate, and storing the result as the return value and as the current value;
    (2G) selecting the next exchange rate object in the exchange rate path, if any, as the current exchange rate;
    (2H) repeating steps (2C) through (2G) until the return value is in the target currency; and
    (2I) returning the return value.

8. A program product comprising:
  (A) a currency conversion mechanism that constructs a compound exchange rate object that contains an exchange rate path from a source currency to a target currency, the exchange rate path comprising an ordered list of at least one object oriented exchange rate object, wherein each exchange rate object specifies a "from currency", a "to currency", and a conversion multiplier for converting an amount in the "from currency" to an equivalent amount in the "to currency" by multiplying the amount in the "from currency" by the conversion multiplier to calculate the equivalent amount in the "to currency", the exchange rate comprising a direct exchange rate if the "from currency" is an expected currency and comprising an inverse exchange rate if the "to currency" is the expected currency, the compound exchange rate object performing the steps of:
    (1) selecting the first exchange rate in the exchange rate path as a current exchange rate;
    (2) selecting the value in the source currency as the current value;
    (3) determining the "from currency" of the current exchange rate;
    (4) determining from the "from currency" of the current exchange rate whether the current exchange rate is a direct exchange rate;
    (5) if the current exchange rate is a direct exchange rate, multiplying the current value by the conversion multiplier corresponding to the current exchange rate, and storing the result as a return value and as the current value;
    (6) if the current exchange rate is an inverse exchange rate, dividing the current value by the conversion multiplier corresponding to the current exchange rate, and storing the result as the return value and as the current value;
    (7) selecting the next exchange rate object in the exchange rate path, if any, as the current exchange rate;
    (8) repeating steps (3) through (7) until the return value is in the target currency; and
    (9) returning the return value; and (B) signal bearing media bearing the currency conversion mechanism.

9. The program product of claim 8 wherein the signal bearing media comprises recordable media.

10. The program product of claim 8 wherein the signal bearing media comprises transmission media.

11. The program product of claim 8 wherein the currency conversion mechanism evaluates the "from currency" for each exchange rate in the exchange rate path, the conversion mechanism performing only one of the steps of:
   a) multiplying the currency value by the exchange rate conversion multiplier if the "from currency" of the exchange rate corresponds to the currency value;
   b) dividing the currency value by the exchange rate conversion multiplier if the "from currency" of the exchange rate does not correspond to the currency value.

12. The program product of claim 8 further comprising an exchange rate policy residing in the memory that defines rules for constructing the exchange rate path to assure the currency conversion mechanism performs currency conversions in accordance with the rules in the exchange rate policy.

13. The program product of claim 12 wherein the exchange rate policy specifies rules for constructing the exchange rate in accordance with rules established by the European Monetary Union for converting currencies after introduction of the euro, namely:

that the conversion from a first national currency to a second national currency be performed by performing steps that include the steps of:
   1) converting an amount in the first national currency to an equivalent amount in euros without using inverted exchange rates;
   2) converting the equivalent amount in euros to an equivalent amount in the second national currency without using inverted exchange rates.

\* \* \* \* \*